(12) United States Patent
Katz (10) Patent No.: US 6,553,012 B1
(45) Date of Patent: Apr. 22, 2003

(54) METHOD AND APPARATUS FOR DIRECTIONAL RADIO COMMUNICATION

(75) Inventor: Marcos Katz, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/355,137
(22) PCT Filed: Feb. 13, 1997
(86) PCT No.: PCT/EP97/00665
  § 371 (c)(1),
  (2), (4) Date: Sep. 17, 1999
(87) PCT Pub. No.: WO98/36597
  PCT Pub. Date: Aug. 20, 1998
(51) Int. Cl.⁷ .................................................. H04Q 7/00
(52) U.S. Cl. ......................... 370/328; 455/562; 342/373
(58) Field of Search ................................. 455/561, 562, 455/456, 507, 449, 426, 450; 370/328, 336, 337, 345, 342; 342/373, 372

(56) References Cited

U.S. PATENT DOCUMENTS

| | | | | |
|---|---|---|---|---|
| 4,527,284 A | * | 7/1985 | Rottger | 455/436 |
| 4,901,085 A | * | 2/1990 | Spring et al. | 342/373 |
| 5,515,378 A | | 5/1996 | Roy, III et al. | |
| 5,576,717 A | | 11/1996 | Searle et al. | |
| 5,610,617 A | | 3/1997 | Gans et al. | |
| 5,621,752 A | | 4/1997 | Antonio et al. | |
| 5,745,858 A | * | 4/1998 | Sato et al. | 455/562 |
| 5,771,017 A | | 6/1998 | Dean et al. | |
| 5,809,422 A | * | 9/1998 | Raleigh et al. | 455/449 |
| 5,856,804 A | | 1/1999 | Turcotte et al. | |
| 5,884,187 A | | 3/1999 | Ziv et al. | |
| 5,893,033 A | | 4/1999 | Keskitalo et al. | |
| 5,894,598 A | | 4/1999 | Shoki | |
| 5,940,774 A | * | 8/1999 | Schmidt et al. | 455/561 |
| 5,999,800 A | | 12/1999 | Choi et al. | |
| 6,018,643 A | | 1/2000 | Golemon et al. | |
| 6,038,459 A | * | 3/2000 | Searle et al. | 455/562 |
| 6,097,970 A | | 8/2000 | Angus et al. | |
| 6,195,567 B1 | * | 2/2001 | Lee | 455/562 |
| 6,233,466 B1 | | 5/2001 | Wong et al. | |
| 6,301,238 B1 | * | 10/2001 | Hagerman et al. | 370/336 |

FOREIGN PATENT DOCUMENTS

| | | |
|---|---|---|
| EP | 647 978 | 4/1995 |
| EP | 715 478 | 6/1996 |
| EP | 729 285 | 8/1996 |
| EP | 755 090 | 1/1997 |
| EP | 755 093 | 1/1997 |
| WO | 96/00466 | 1/1996 |
| WO | 96/09696 | 3/1996 |
| WO | WO 96/37969 | 11/1996 |

* cited by examiner

Primary Examiner—Nguyen T. Vo
Assistant Examiner—Nghi H. Ly
(74) Attorney, Agent, or Firm—Merchant & Gould P.C.

(57) ABSTRACT

A method of directional radio communication between a first station (BTS4) and a second station (MS) comprises the following steps. A plurality of consecutive signals are received at the first station (BTS4) from the second station (MS). The signals are each receivable from at least one of a plurality of different directions. For each of a plurality of sequential signals which are received by the first station (BTS4) from the second station (MS) the value of at least one parameter is determined. The value of at least one parameter is selected for a signal to be transmitted from the first station (BTS4) to the second station (MS), the value of the at least one parameter of the signal to be transmitted by the first station (BTS4) being selected in dependence on the determined values of the at least one parameter of the plurality of sequential signals.

15 Claims, 7 Drawing Sheets

| SCORE VECTOR |
|---|
| 0 |
| 1 |
| 8 |
| 6 |
| 4 |
| 1 |
| 0 |
| 0 |

FIG. 8b

S-T WEIGHTING PATTERN

| 0 | 0 | 0 | 0 |
| 1 | 1 | 1 | 1 |
| 2 | 2 | 2 | 2 |
| 2 | 2 | 2 | 2 |
| 2 | 2 | 2 | 2 |
| 1 | 2 | 2 | 1 |
| 1 | 1 | 1 | 1 |
| 0 | 0 | 0 | 0 |

4  3  2  1 ——BLOCK 106

FIG. 8a

BEAM SELECTION MATRIX

| BEAM No | i-(N-1) | ... | i-5 | i-4 | i-3 | i-2 | i-1 | i |
|---|---|---|---|---|---|---|---|---|
| 1 | 0 | | 1 | 0 | 0 | 0 | 0 | 0 |
| 2 | 0 | | 0 | 1 | 0 | 0 | 1 | 0 |
| 3 | 1 | | 1 | 1 | 1 | 1 | 1 | 1 |
| 4 | 1 | | 1 | 0 | 1 | 1 | 0 | 1 |
| 5 | 0 | | 1 | 0 | 0 | 1 | 0 | 1 |
| 6 | 0 | | 1 | 0 | 0 | 0 | 1 | 0 |
| 7 | 1 | | 0 | 0 | 0 | 0 | 0 | 0 |
| 8 | 0 | | 0 | 0 | 0 | 0 | 0 | 0 |

——BLOCK 102

METHOD AND APPARATUS FOR DIRECTIONAL RADIO COMMUNICATION

The present invention relates to a method and apparatus for directional radio communication in which signals between a first station and a second station may be transmitted only in certain directions. In particular, but not exclusively, the present invention is applicable to cellular communication networks using space division multiple access.

With currently implemented cellular communication networks, a base transceiver station (BTS) is provided which transmits signals intended for a given mobile station (MS), which may be a mobile telephone, throughout a cell or cell sector served by that base transceiver station. However, space division multiple access (SDMA) systems have now been proposed. In a space division multiple access system, the base transceiver station will not transmit signals intended for a given mobile station throughout the cell or cell sector but will only transmit the signal in the beam direction from which a signal from the mobile station is received. SDMA systems may also permit the base transceiver station to determine the direction from which signals from the mobile station are received.

SDMA systems may allow a number of advantages over existing systems to be achieved. In particular, as the beam which is transmitted by the BTS may only be transmitted in a particular direction and accordingly may be relatively narrow, the power of the transceiver can be concentrated into that narrow beam. It is believed that this results in a better signal to noise ratio with both the signals transmitted from the base transceiver station and the signals received by the base transceiver station. Additionally, as a result of the directionality of the base transceiver station, an improvement in the signal to interference ratio of the signal received by the base transceiver station can be achieved. Furthermore, in the transmitting direction, the directionality of the BTS allows energy to be concentrated into a narrow beam so that the signal transmitted by the BTS can reach far away located mobile stations with lower power levels than required by a conventional BTS. This may allow mobile stations to operate successfully at greater distances from the base transceiver station which in turn means that the size of each cell or cell sector of the cellular network can be increased. As a consequence of the larger cell size, the number of base stations which are required can also be reduced leading to lower network costs. SDMA systems generally require a number of antenna elements in order to achieve the required plurality of different beam directions in which signals can be transmitted and received. The provision of a plurality of antenna elements increases the sensitivity of the BTS to received signals. This means that larger cell sizes do not adversely affect the reception of signals by the BTS from mobile stations.

SDMA systems may also increase the capacity of the system, that is the number of mobile stations which can be simultaneously supported by the system is increased. This is due to the directional nature of the communication which means that the BTS will pick up less interference from mobile stations in other cells using the same frequency. The BTS will generate less interference to other mobile stations in other cells using the same frequency when communicating with a given MS in the associated cell.

Ultimately, it is believed that SDMA systems will allow the same frequency to be used simultaneously to transmit to two or even more different mobile stations which are arranged at different locations within the same cell. This can lead to a significant increase in the amount of traffic which can be carried by cellular networks.

SDMA systems can be implemented in analogue and digital cellular networks and may be incorporated in the various existing standards such as GSM, DCS 1800, TACS, AMPS and NMT. SDMA systems can also be used in conjunction with other existing multiple access techniques such as time division multiple access (TDMA), code division multiple access (CDMA) and frequency division multiple access (FDMA) techniques.

One problem with SDMA systems is that the direction in which signals should be transmitted to a mobile station needs to be determined. In certain circumstances, a relatively narrow beam will be used to send a signal from a base transceiver station to a mobile station. Therefore, the direction of that mobile station needs to be assessed reasonably accurately. As is known, a signal from a mobile station will generally follow several paths to the BTS. Those plurality of paths are generally referred to as multipaths. A given signal which is transmitted by the mobile station may then be received by the base transceiver station from more than one direction due to these multipath effects.

In general, the decision as to the beam direction which is to be used by the BTS in order to transmit a signal to a mobile station is based on information corresponding to the data burst previously received by the BTS from the given MS. As the decision is based on information received corresponding to only one burst, problems may occur if, for example, the data burst transmitted by the mobile station is superimposed with strong interference.

An additional problem is that the direction in which a signal is to be transmitted by the BTS to the mobile station is determined on the basis of the uplink signals received by the BTS from the mobile station. However, the frequencies of the down link signals transmitted from the mobile station to the BTS are different from the frequencies used for the signals transmitted by the BTS to the mobile station. The difference in the frequencies used in the uplink and downlink signals means that the behaviour of the channel in the uplink direction may be different from the behaviour of the channel in the downlink direction. Thus the optimum direction determined for the uplink signals will not always be the optimum direction for the downlink signals.

A method of transmitting a pilot signal in a code division multiple access cellular radio system is disclosed in WO 96/37969. The method involves receiving at a first station a plurality of signals from a second station, determining a value of a parameter for each received signal and selecting the value of a parameter for a signal to be transmitted in dependence on the value of the parameter of the received signals. This method searches from the best signal continuously and determines the nature of the radio environment by means of a plurality of phasing means. A method of directional radio communication based on similar principles is disclosed in U.S. Pat. No. 5,515,378.

It is therefore an aim of certain embodiments of the present invention to address these difficulties.

According to a first aspect of the present invention, there is provided a method of directional radio communication between a first station and a second station, said method comprising the steps of:

receiving at said first station a plurality of consecutive signals from said second station, said signals each being receivable from at least one of a plurality of different directions;

determining a value of at least one parameter for each of a plurality of sequential signals from the consecutive signals which are received by the first station from the second station; and selecting a value of at least one parameter for a signal to be transmitted from said first station to said second station, said value of the at least one parameter of the signal to be transmitted by the first station being selected in dependence on said determined value of said at least one parameter of said plurality of sequential signals, wherein said selecting step comprises applying a weighting pattern to said plurality of sequential signals.

By basing a parameter of the signal to be transmitted from the second station to the first station on the parameter of a plurality of signals previously received by the first station, the problems caused by, for example, strong interference in the most recently received signal can be reduced.

Preferably, said step of determining a value of at least one parameter comprises determining the or each direction for each of the plurality of sequential signals and said selecting step comprises selecting at least one direction for the transmission of a signal from the first station to the second station, said at least one direction being selected in dependence on the determined directions for said plurality of sequential signals. By basing the or each direction in which a signal is to be transmitted by the first station to the second station on a plurality of signals received from the second station, the probability that a signal transmitted by the first station will be received by the second station is increased.

Alternatively and/or additionally said step of determining a value of at least one parameter comprises determining the strength of each of said plurality of sequential signals and said selecting step comprises selecting the strength of the signal to be transmitted to said second station, the strength of said signal being selected in dependence on said determined strengths for said plurality of sequential signals. By basing the strength of the signal to be transmitted by the first station to the second station on a plurality of signals received from the second station, the probability that the signal strength will be at the right level is increased. If the signal strength is too low, the second station may not receive the signal, whilst if the signal strength is too high, the risk of interference is unnecessarily increased. It should be appreciated that in those embodiments of the invention, where the signal is transmitted in a plurality of different directions, the strength of the signal in those different directions may differ.

Preferably, the selecting step comprises applying a weighting pattern to said plurality of sequential signals. The term weighting pattern also includes algorithms which provide a weighting function. The weighting pattern may be a uniform weighting pattern so that each of said plurality of sequential signals is given equal weight. The weighting pattern alternatively may be such that the more recently received ones of said plurality of sequential signals are given more weight than the less recently received ones of said plurality of sequential signals. The weighting pattern may be an exponential or linearly increasing weighting pattern. These are just two examples of possible patterns. Any other suitable pattern can be used. Alternatively, the weighting pattern may be defined by an algorithm. It should be appreciated that in some embodiments the weighting pattern is applied to values determined for said parameter.

Preferably, the selecting means selects one of a plurality of weighting patterns in dependence on the radio environment. The weighting patterns may be as outlined previously. For example, in static or slowly changing radio environments, the uniform weighting pattern may be used since it can be expected that the determined the or each direction or strength of the plurality of sequential signals will remain generally the same for those plurality of consecutive signals. Alternatively, if the radio environment is a fast changing radio environment, then the linearly increasing or exponential weighting pattern can be used. With these latter patterns, the previously determined the or each direction or strength of the plurality of received sequential signals will have a negligible influence on the selected beam direction.

Preferably, the method further comprises the step of defining at the first station a plurality of beam directions for transmitting a radiation beam, wherein each of said beam directions is individually selectable.

According to the second aspect of the present invention, there is provided a first station for directional radio communication with a second station, said first station comprising:

receiver means for receiving a plurality of consecutive signals from said second station, said signals each being receivable from at last one of a plurality of different directions;

determining means for determining the value of at least one parameter for each of a plurality of sequential signals from the consecutive signals which are received by the first station from the second station;

transmitter means for transmitting a signal from the first station to the second station; and control means for controlling said transmitter means, said control means being arranged to select a value of at least one parameter for the signal to be transmitted by said transmitter means, said value of at least one parameter being selected in dependence on the determined values of said at least one parameter for said plurality of sequential signals, wherein said control means is arranged to apply a weighting pattern to said plurality of sequential signals.

Preferably, said determining means is arranged to determine the or each direction for each of the plurality of sequential signals and the control means is arranged to select at least one direction for the transmission of the signal by the transmitter means, said at least one direction being selected in dependence on the determined the or each direction for said plurality of sequential signals. Alternatively or additionally said determining means is arranged to determine the strength of each of said plurality of sequential signals and the control means is arranged to select the strength of the signal to be transmitted by the transmitter means, the strength of the signal being selected in dependence on the determined strength for said plurality of sequential signals.

The control means may be arranged to apply a weighting pattern to said plurality of sequential signals.

Storage means may be provided for storing said determined parameters for each of the plurality of sequential signals.

The receiver means and the transmitter means may comprise an antenna array which is arranged to provide a plurality of signal beams in a plurality of different directions. The antenna array may comprise a phased antenna array or may comprise a plurality of separate antenna elements each of which is arranged to provide a beam in a defined direction. Two separate arrays may be provided, one to receive signals and the other to transmit signals. Alternatively, a single array may be provided both to receive and to transmit signals.

The transmitter means may be arranged to provide a radiation beam in a plurality of beam directions, wherein each of the beam directions is individually selectable.

Preferably, the strength of each of the beam directions is individually selectable.

The present invention is particularly applicable to cellular communication networks. In such networks the first station may be a base transceiver station and the second station may be a mobile station respectively. However, it should be appreciated that embodiments of the invention may be applicable to any other type of radio communication network where both the first and second stations may be both stationary or both mobile.

For a better understanding of the present invention and as to how the same may be carried into effect, reference will now be made by way of example to the accompanying drawings in which.

Figure 1:
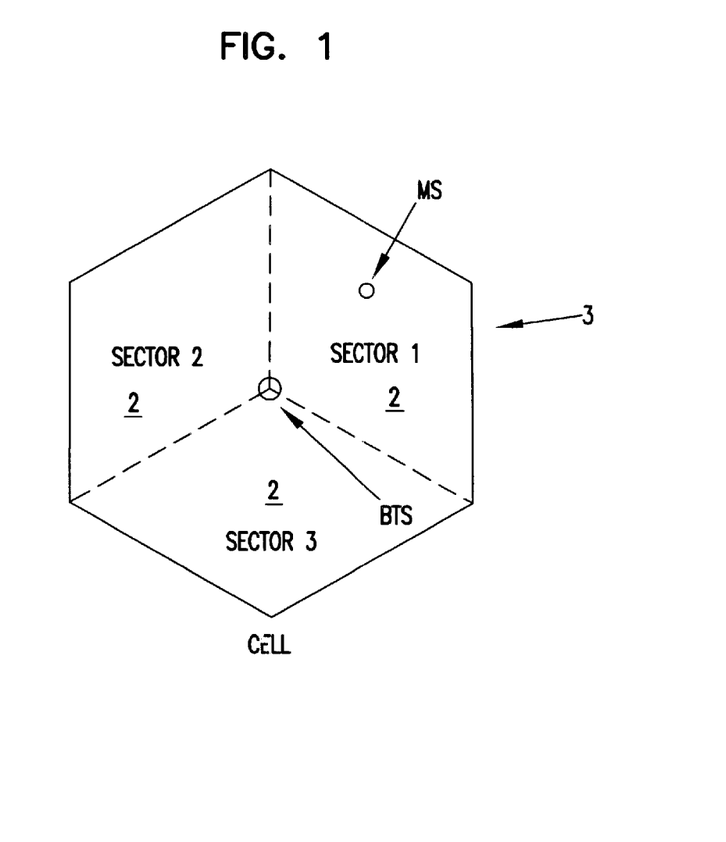
FIG. 1 shows a schematic view of a base transceiver station (BTS) and its associated cells sectors.

Reference will first be made to FIG. 1 in which three cell sectors 2 defining a cell 3 of a cellular mobile telephone network are shown. The three cell sectors 2 are served by respective base transceiver stations (BTS) 4. Three separate base transceiver stations 4 are provided at the same location. Each BTS 4 has a separate transceiver which transmits and receives signals to and from a respective one of the three cell sectors 2. Thus, one dedicated base transceiver station is provided for each cell sector 2. The BTS 4 is thus able to communicate with mobile stations (MS) such as mobile telephones which are located in respective cell sector 2.

The present embodiment is described in the context of a GSM (Global System for Mobile Communications) network. In the GSM system, a frequency/time division multiple access F/TDMA system is used. Data is trasmitted between the BTS 4 and the MS in bursts. The data bursts include a training sequence which is a known sequence of data. The purpose of the training sequence will be described hereinafter. Each data burst is transmitted in a given frequency band in a predetermined time slot in that frequency band. The use of a directional antenna array allows space division multiple access also to be achieved. Thus, in embodiments of the present invention, each data burst will be transmitted in a given frequency band, in a given time slot, and in a given direction. An associated channel can be defined for a given data burst transmitted in the given frequency, in the given time slot, and in the given direction. As will be discussed in more detail hereinafter, in some embodiments of the present invention, the same data burst is transmitted in the same frequency band, in the same time slot but in two different directions.

Figure 2:
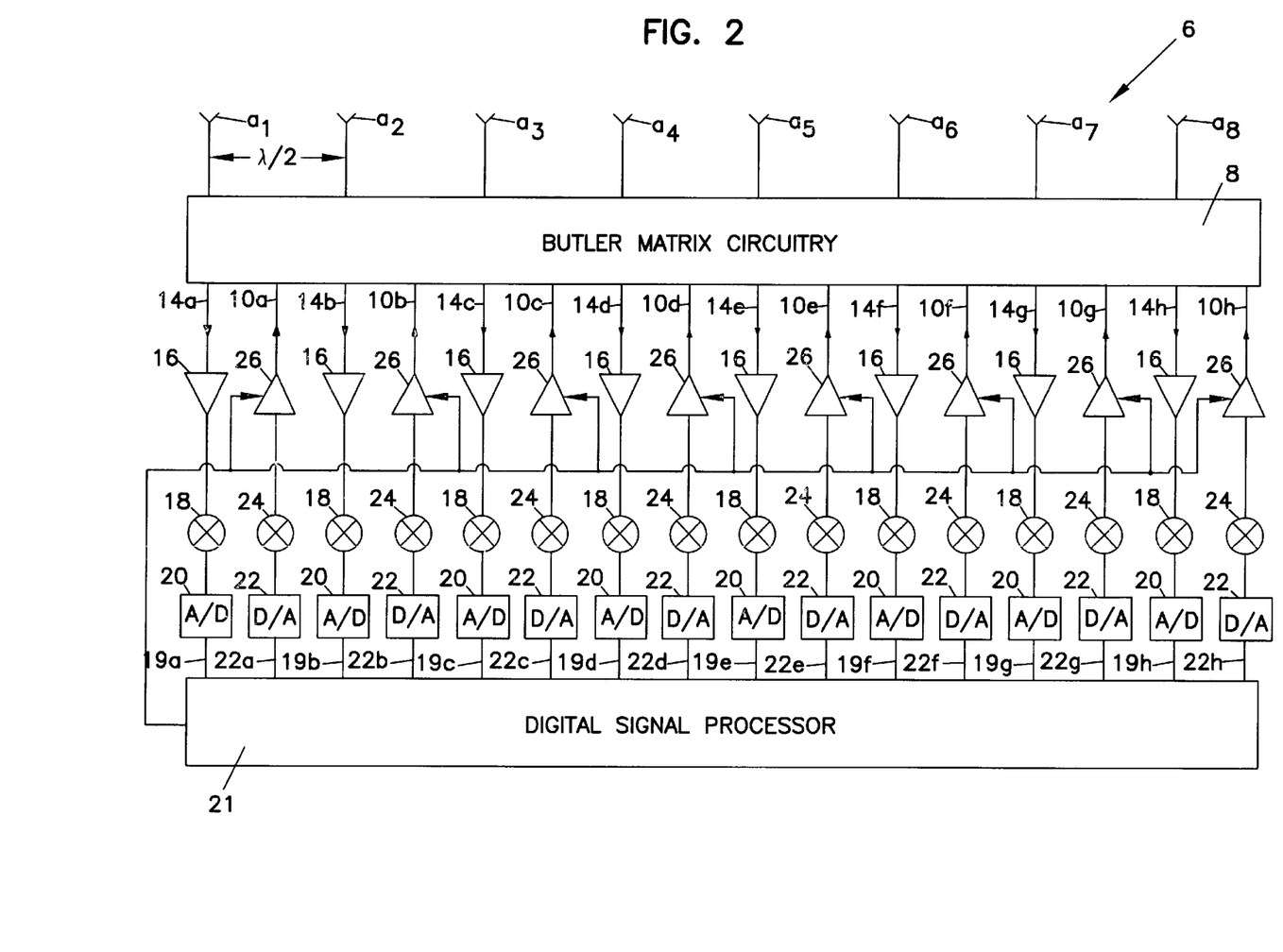
FIG. 2 shows a simplified representation of an antenna array and the base transceiver station.

FIG. 2 shows a schematic view of one antenna array 6 of one BTS 4 which acts as a transceiver. It should be appreciated that the array 6 shown in FIG. 2 only serves one of the three cell sectors 2 shown in FIG. 1. Another two antenna arrays 6 are provided to serve the other two cell sectors 2.

The antenna array 6 has eight antenna elements $a_1 \ldots a_8$. The elements $a_1 \ldots a_8$ are arranged to have a spacing of a half wavelength between each antenna element $a_1 \ldots a_8$ and are arranged in a horizontal row in a straight line. Each antenna element $a_1 \ldots a_8$ is arranged to transmit and receive signals and can have any suitable construction. Each antenna element $a_1 \ldots a_8$ may be a dipole antenna, a patch antenna or any other suitable antenna. The eight antenna elements $a_1 \ldots a_8$ together define a phased array antenna 6.

Figure 3:
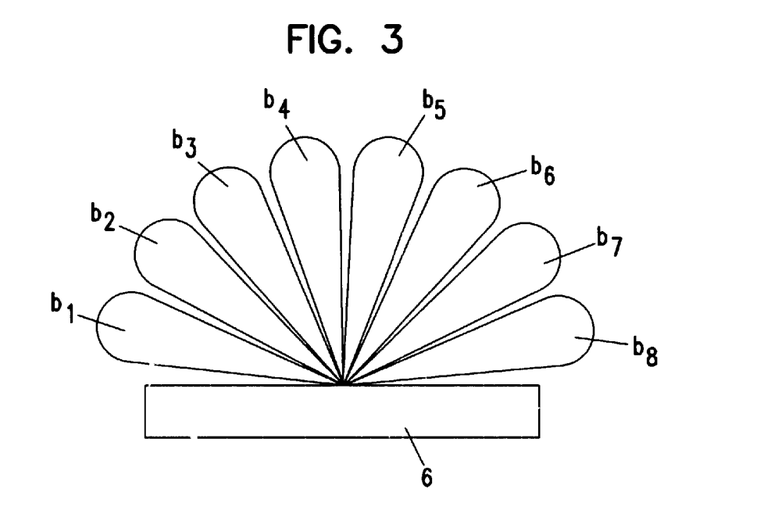
FIG. 3 shows the fixed beam pattern provided by the antenna array of FIG. 2.

As is known, each antenna element $a_1 \ldots a_8$ of the phased array antenna 6 is supplied with the same signal to be trasmitted to a mobile station MS. However, the phases of the signals supplied to the respective antenna elements $a_1 \ldots a_8$ are shifted with respect to each other. The differences in the phase relationship between the signals supplied to the respective antenna elements $a_1 \ldots a_8$ gives rise to a directional radiation pattern. Thus, a signal from the BTS 4 may only be transmitted in certain directions in the cell sector 2 associated with the array 6. The directional radiation pattern achieved by the array 6 is a consequence of constructive and destructive interference which arises between the signals which are phase shifted with respect to each other and transmitted by each antenna element $a_1 \ldots a_8$. In this regard, reference is made to FIG. 3 which illustrates the directional radiation pattern which is achieved with the antenna array 6. The antenna array 6 can be controlled to provide a beam $b_1 \ldots b_8$ in any one of the eight directions illustrated in FIG. 3. For example, the antenna array 6 could be controlled to transmit a signal to a MS only in the direction of beam $b_5$ or only in the direction of beam $b_6$. As will be discussed in further detail hereinafter, it is possible also to control the antenna array 6 to transmit a signal in more than one beam direction at the same time. For example, a signal may be transmitted in the two directions defined by beam $b_5$ and beam $b_6$. FIG. 3 is only a schematic representation of the eight possible beam directions which can be achieved with the antenna array 6. In practice, however, there will in fact be an overlap between adjacent beams to ensure that all of the cell sector 2 is served by the antenna array 6.

The relative phase of the signal provided at each antenna element $a_1 \ldots a_8$ is controlled by Butler matrix circuitry 8 so that a signal can be transmitted in the desired beam direction or directions. The Butler matrix circuitry 8 thus provides a phase shifting function. The Butler matrix circuitry 8 has eight inputs 10a–h from the BTS 4 and eight outputs, one to each antenna element $a_1 \ldots a_8$. The signals received by the respective inputs 10a–h comprise the data bursts to be transmitted. Each of the eight inputs 10a–h represents the beam direction in which a given data burst could be transmitted. For example, when the Butler matrix circuitry 8 receives a signal on the first input 10a, the Butler matrix circuitry 8 applies the signal provided on input 10a to each of the antenna elements $a_1 \ldots a_8$ with the required phase differences to cause beam $b_1$ to be produced so that the data burst is transmitted in the direction of beam $b_1$. Likewise, a signal provided on input 10b causes a beam in the direction of beam $b_2$ to be produced and so on.

As already discussed, the antenna elements $a_1 \ldots a_8$ of the antenna array 6 receive signals from a MS as well as transmit signals to a MS. A signal transmitted by a MS will generally be received by each of the eight antenna elements $a_1 \ldots a_8$. However, there will be a phase difference between each of the signals received by the respective antenna elements $a_1 \ldots a_8$. The Butler matrix circuitry 8 is therefore able to determine from the relative phases of the signals received by the respective antenna elements $a_1 \ldots a_8$ the beam direction from which the signal has been received. The Butler matrix circuitry 8 thus has eight inputs, one from each of the antenna elements $a_1 \ldots a_8$ for the signal received by each antenna element. The Butler matrix circuitry 8 also has eight outputs 14a–h. Each of the outputs 14a to 14h corresponds to a particular beam direction from which a given data burst could be received. For example, if the antenna array 6 receives a signal from a MS from the direction of beam $b_1$, then the Butler matrix circuitry 8 will output the received signal on output 14a. A received signal from the direction of beam $b_2$ will cause the received signal to be output from the Butler matrix circuitry 8 on output 14b and so on. In summary, the Butler matrix circuitry 8 will receive on the antenna elements $a_1 \ldots a_8$ eight versions of the same signal which are phase shifted with respect to one another. From the relative phase shifts, the Butler matrix circuitry 8 determines the direction from which the received signal has been received and outputs a signal on a given output 14a–h in dependence on the direction from which the signal has been received.

It should be appreciated that in some environments, a single signal or data burst from a MS may appear to come from more than one beam direction due to reflection of the signal whilst it travels between the MS and the BTS 4, provided that the reflections have a relatively wide angular spread. The Butler matrix circuitry 8 will provide a signal on each output 14a–h corresponding to each of the beam directions from which a given signal or data burst appears to come. Thus, the same data burst may be provided on more than one output 14a–h of the Butler matrix circuitry 8. However, the signals on the respective outputs 14a–h may be time delayed with respect to each other.

Each output 14a–h of the Butler matrix circuitry 8 is connected to the input of a respective amplifier 16 which amplifies the received signal. One amplifier 16 is provided for each output 14a–h of the Butler matrix circuitry 8. The amplified signal is then processed by a respective processor 18 which manipulates the amplified signal to reduce the frequency of the received signal to the baseband frequency so that the signal can be processed by the BTS 4. To achieve this, the processor 18 removes the carrier frequency component from the input signal. Again, one processor 18 is provided for each output 14a–h of the Butler matrix circuitry 8. The received signal, which is in analogue form, is then converted into a digital signal by an analogue to digital (A/D) converter 20. Eight A/D converters 20 are provided, one for each output 14a–h of the Butler matrix circuitry 8. The digital signal is then input to a digital signal processor 21 via a respective input 19a–h for further processing.

The digital signal processor 21 also has eight outputs 22a–h, each of which outputs a digital signal which represents the signal which is to be transmitted to a given MS. The output 22a–h selected represents the beam direction in which the signal is to be transmitted. That digital signal is converted to an analogue signal by a digital to analogue (D/A) converter 23. One digital to analogue converter 23 is provided for each output 22a–h of the digital signal processor 21. The analogue signal is then processed by processor 24 which is a modulator which modulates onto the carrier frequency the analogue signal to be transmitted. Prior to the processing of the signal by the processor 24, the signal is at the baseband frequency. The resulting signal is then amplified by an amplifier 26 and passed to the respective input 10a–h of the Butler matrix circuitry 8. A processor 24 and an amplifier 26 are provided for each output 22a–h of the digital signal processor 21.

Figure 4:
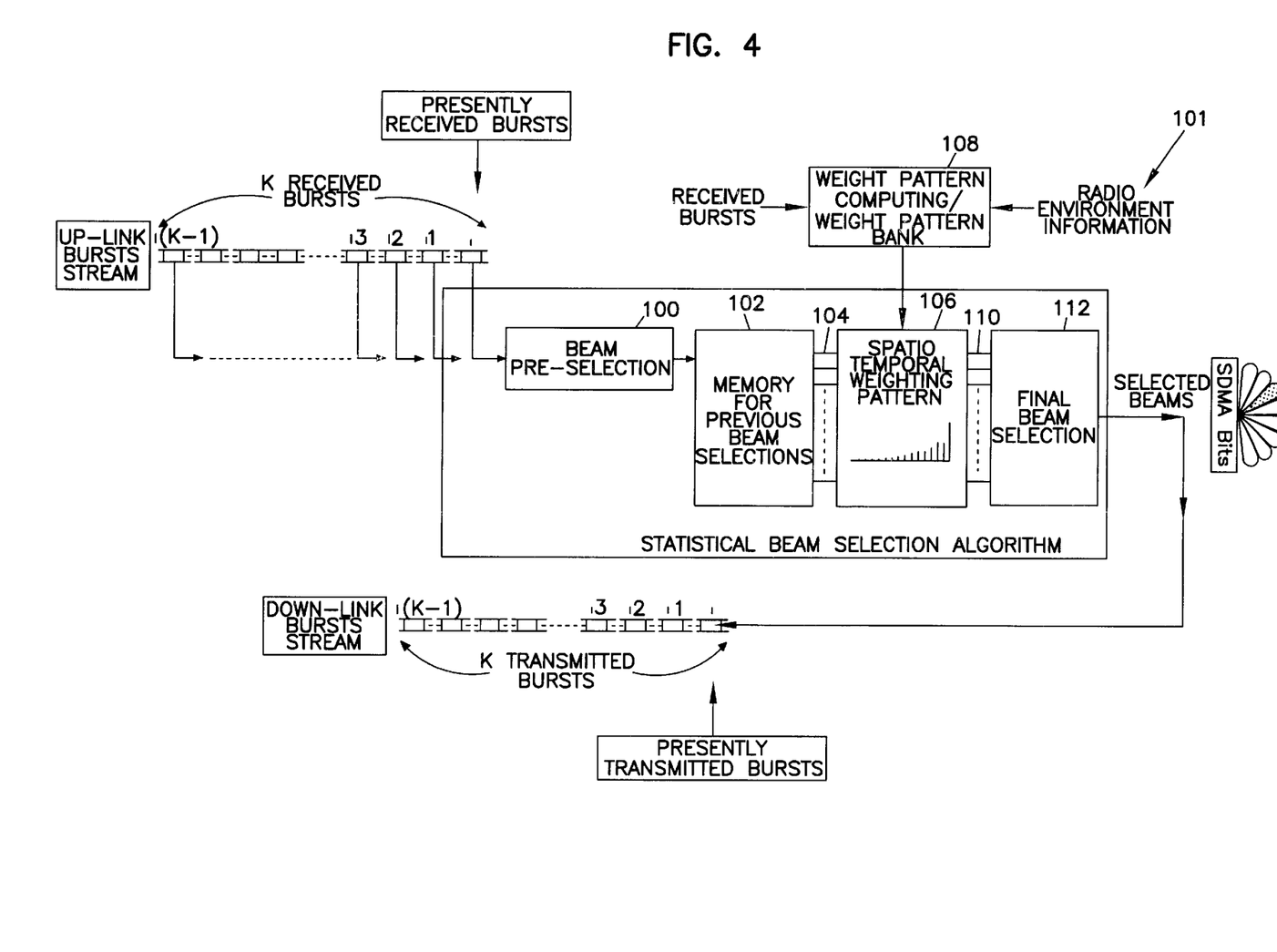
FIG. 4 shows a schematic view of part of a beam selection portion of the digital signal processor.

Reference will now be made to FIG. 4 which shows a schematic representation of a beam selection arrangement 101 which forms part of the digital signal processor 21 and which is arranged to select the beam direction or directions for a data burst to be transmitted to a given mobile station by the BTS 4. The beam selection arrangement 101 comprises a beam pre-selection block 100. The beam pre-selection block 100 determines for each data burst received from a given mobile station the or each direction from which that given data burst is received. The beam pre-selection block 101 may also determine the strength of the data burst received in each of the different directions. The beam pre-selection block 101 may be arranged to select only a limited number of beam directions as representative of the direction from which a given data burst is received. For example, the beam pre-selection block 100 may select a single beam direction for each data burst. That single beam direction may correspond to the direction from which the strongest signal is received or may correspond to the direction from which the data burst is received with minimum delay. Of course two or more beam directions may be selected as representative of the directions from which a given data burst is received. Any suitable criteria can be used in order to make the beam selection. In some embodiments of the invention, the beam selection criteria may be varied for example to take into account changes in the radio environment or changes in the distance between the mobile station and the base transceiver station.

Figure 8A:
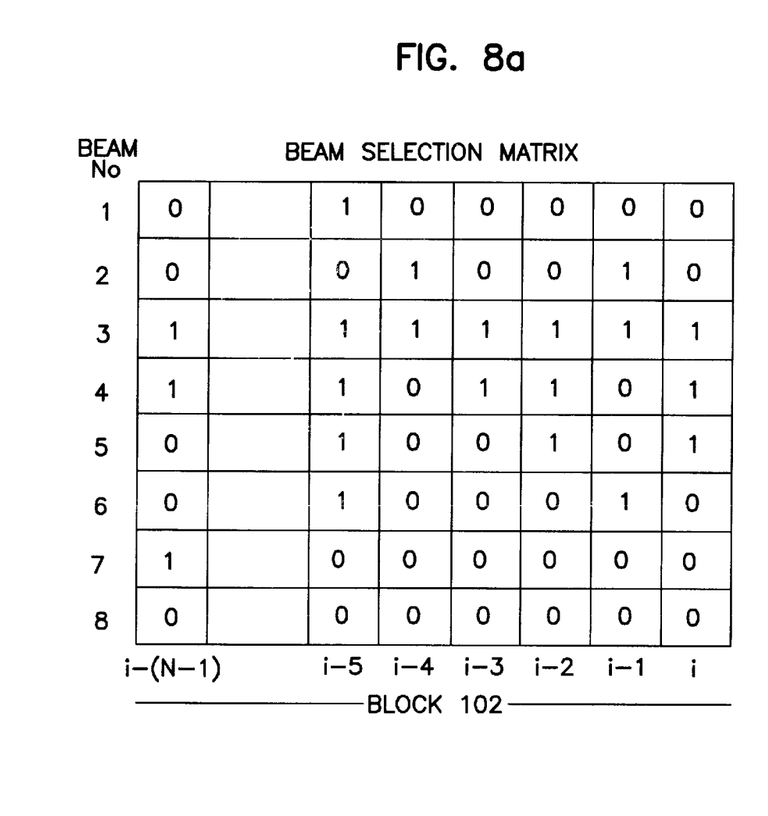
FIGS. 8a to 8c respectively illustrate the pattern selection data stored by the memory 1, a weighting pattern stored by the spatio temporal weighting pattern block and the data calculated by that block.

The beam direction or directions determined by the beam pre-selection block 100 is output to a memory 102 via outputs 103. Additionally, information on the strength of the data burst received in the respective beam direction may also be output to the memory 102. The memory 102 is arranged to store this information for the n preceding burst received by the BTS from the desired MS. The memory 102 may be in the form of a FIFO register. Thus, when the beam direction and signal strength information for the next data burst received from the desired MS is determined, that information is stored in the memory 102 and the information on the n+1 previous data burst is removed from the memory. In other words, the oldest information in the register is shifted out in order to make room for the newest information. Reference is made to FIG. 8a which illustrates an example of the information stored in the memory 102. For each beam, a one or a zero is stored for a given data burst. A one indicates that the beam preselection block 100 selected that beam in the given data burst. In the example shown in FIG. 8a, three beams are selected by the beam preselection block 100 for a given data burst. For example, for the ith data burst the third, fourth and fifth beams were selected whilst the first, second, sixth, seventh and eight beams were not selected.

The memory 102 has a plurality of outputs 104 which are connected to a spatio-temporal weighting pattern block 106. In one embodiment of the present invention, outputs 104 are provided. Thus, one output 104 is provided for the information stored in the memory 102 for each one of the antenna elements. The spatio-temporal weighting pattern block 106 applies a weighting pattern to the information stored in respect of the K preceding data bursts received from the given MS.

Figure 8B:
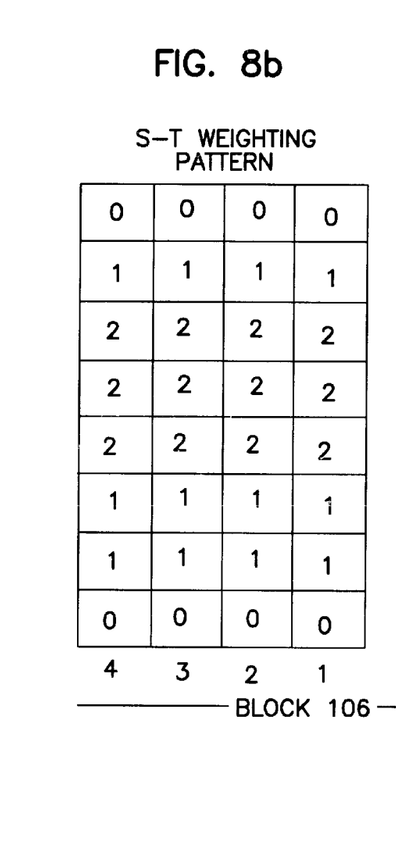

Reference is made to FIG. 8b which illustrates an example of a weighting pattern stored by block 106. As can be seen from this figure, the weighting pattern can be regarded as from eight separate patterns, one for each beam. Furthermore, as can be seen, the weighting pattern differs for different beam directions. For example, the weighting pattern for the first beam would be (0,0,0,0) and (1,1,1,1) for the second beam. In this example, the weighting pattern is only applied to the four preceding data bursts. Thus K=4. In this example, the weighting pattern applied constant weights to each of the four previously received data bursts for each beam although the weighting patterns differs for each beam.

Reference is now made to FIG. 5 which shows four examples of weighting patterns. However it should be appreciated that these four patterns are by of example only. In particular any suitable weighting pattern or algorithm can be used.

Figure 5A:
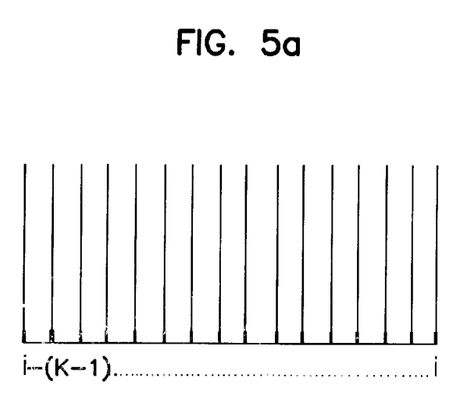
FIG. 5 shows four different weighting patterns.
Figure 5B:
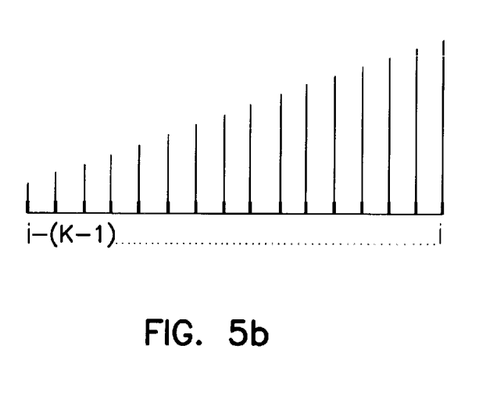

FIG. 5a shows a first weighting pattern in which all the K previously beam selections for previously received data bursts are of equal importance in determining the beam direction or directions in which the next data burst is to be transmitted by the BTS 4 to the desired MS. FIG. 5b shows a second weighting pattern where the closer in time that a previously received data burst is to the currently received data burst, the higher its influence on the beam direction or direction selected for the transmission of the next data burst to the desired MS. In other words, the beam selections made on the Kth previous burst will have a smaller influence on the decision as to the direction in which the next burst will be transmitted by the BTS to the desired MS as compared to the most recently received data burst. The weighting pattern illustrated in FIG. 5b shows a linear increasing pattern.

Figure 5C:
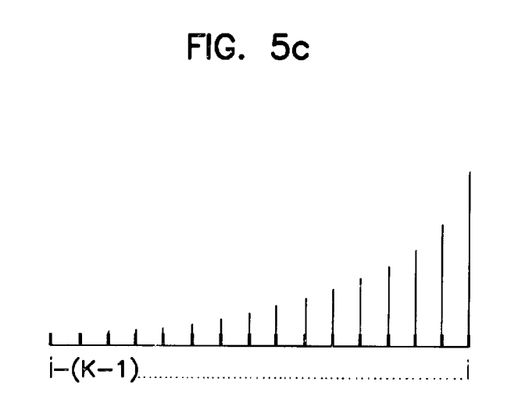

The weighting pattern shown in FIG. 5c is similar to that shown in FIG. 5b in that the information on the Kth previous beam selections made by the BTS has a small impact on the decision as to the direction in which the next data burst is to be transmitted by the BTS to the desired MS. The exponential increasing weighting pattern shown in FIG. 5c thus takes only into account the information determined by the beam pre-selection block 100 for only the most recently received data bursts.

Figure 5D:
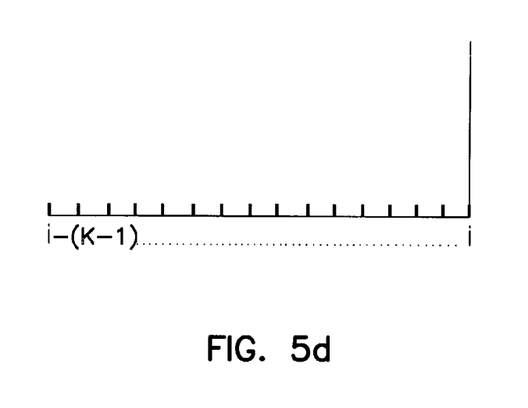

FIG. 5d shows the limit situation where the selection as to the beam direction or directions in which a data burst is to be transmitted by the BTS to the desired MS is based purely on the data burst most recently received by the BTS from the desired MS. This would be selected when the radio environment changes very rapidly so that the previous beam selections would have very little influence on the current beam selection.

The spatio temporal weighting pattern block 106 receives an input from a weight pattern bank block 108. This block stores for example the four patterns illustrated in FIG. 5. The weight pattern bank block may also store any other suitable weighting pattern or weighting pattern algorithm. In the latter case, the weighting pattern need not follow a specific function. One or more weighting pattern algorithms can be provided to replace the stored weighting patterns. Any suitable number of weighting patterns can be stored. For example in one embodiment of the invention, only a single weighting pattern or algorithm defining a weighting pattern is stored.

The weight pattern bank block 108 may also be arranged to select the most appropriate weighting pattern for the current radio environment and to output that weighting pattern to the spatio-temporal weighting pattern block 106. When the radio environment is static or slowly changing, then the pattern shown in FIG. 5a would be selected. Thus, all of the K previous bursts are all of equal importance in determining the direction in which the next data burst is to be transmitted by the BTS. The impact therefore of a data burst with, for example, a large amount of interference is greatly reduced by the averaging effect of the consideration of the K preceding data bursts.

In a fast changing radio environment, the pattern illustrated in FIG. 5b or FIG. 5c could be used. A rapidly changing radio environment may occur when a mobile station is moving quickly through an urban environment. In such an environment, the more recently received data bursts will be of more relevance than the less recently received data bursts. Accordingly information on the more recently received data bursts should have a greater influence on the direction in which the or each direction in which the next data burst is to be transmitted by the BTS 4.

In order to determine which weighting pattern is most appropriate, information on the radio environment is input to the weight pattern bank block 108. In one embodiment of the invention, the information on the radio environment can be independently determined. However in the preferred embodiment of the invention, the received data bursts are used to provide the information on the radio environment. For example, the weight pattern bank block 108 may consider the direction or directions from which L preceding bursts are received by the BTS from the desired MS. L may be the same or different to K. If there is little change in the direction or directions from which consecutive data bursts are received, then it can be assumed that the radio environment is static or only slowly changing. The weighting pattern is shown in FIG. 5a could be selected. In contrast, when it is determined that the preceding L data bursts are received from a relatively large number of different directions, then it can be assumed that the mobile is in a fast changing radio environment and either the pattern shown in FIG. 5b or c can be selected. Information on the radio environment may alternatively be prestored. In one further alternative, the statistical information stored by the memory 102 may be used to determine the type of radio environment.

The spatio temporal weighting pattern block 106 applies the selected weighting pattern to the information provided by the beam pre-selection block 101 for the K preceding data bursts received by the BTS from the desired MS. The spatio temporal weighting pattern block 106 calculates for each of the eight possible beam directions a beam score using the following equation:

$$s(i,k)=W_{ST}(i,k)^T b_{ST}(i,k)$$

k=1,2 ... 8 s(i,k) represents the score that the kth beam gets when deciding the beam direction or directions which will be selected for transmitting the ith (or next) burst from the BTS 4 to the desired mobile station.

$W_{ST}(i,k)$ is a K×1 vector containing the K spatio temporal real weights for the kth beam at the ith burst. This takes into account the weighting pattern applied to the received beam selection information for the K preceding bursts.

$b_{ST}(i,k)$ is K×1 binary vector containing statistical information regarding the previous K selections of the Kth beam. If the $b_{ST}(i,r)=1$ where r=1−(K−1), ... , i, this means that the kth beam was selected by the beam pre-selection block 100 during the rth burst. If the $b_{ST}(i,r)=0$, this means that the kth beam was not selected during the rth burst. Accordingly, the score s(i,k) will be 0 if the kth beam was not selected by the beam pre-selection block for the K previous data bursts received from the mobile station.

Figure 8C:
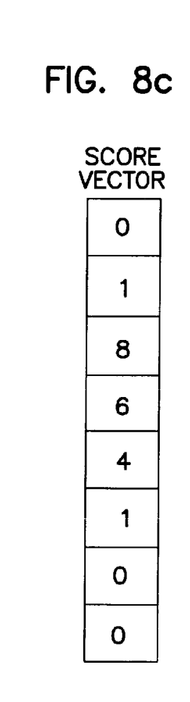

Reference is now made to FIG. 8c which shows the score vectors calculated by the spatio temporal weighting pattern block 106 for each of the eight beams using the selected weighting pattern. For example the vector score for the third beam using the weighting pattern shown in FIG. 8b is as follows:

$$s(i, 3) = W_{ST}(i, 3)^T b_{st}(i, 3)$$

$$= [2, 2, 2, 2] \begin{bmatrix} 1 \\ 1 \\ 1 \\ 1 \end{bmatrix}$$

$$= 2 \cdot 1 + 2 \cdot 1 + 2 \cdot 1 + 2 \cdot 1 = 8$$

The spatio temporal weighting pattern has eight outputs 110 which are input to the final beam selection block 112. Each of the outputs 110 corresponds to one of the eight possible beam directions. In one preferred embodiment of the invention, the score vector calculated by the spatio temporal weighting pattern block 106 is input via the eight outputs 110 to the final beam selection block 112. The final beam selection block 112 then selects those beam directions will be used for transmitting the next data burst from the BTS to the given MS. If only one beam direction is to be used, the beam direction with the highest score out of the eight possible computed scores is selected as the transmitting beam direction. In the example illustrated in FIG. 8c, if only one beam is to be selected, the third beam which has the highest score would be selected. If three beams are to be selected, the third, fourth and fifth beams would be selected. However, it will be appreciated that any suitable number of beam directions can be selected. However, the number of beam directions selected will generally be much less than the number of possible beam directions which can be selected.

In one modification of the present invention, the number of beams to be selected can be varied. For example, a threshold could be set so that only beams with a score of, for example, 6 or more would be selected. This may have the advantage that more beams would be selected when the mobile station is relatively close to the beam transceiver station and less beams would be selected when the mobile station is relatively far from the base transceiver station. It is preferred that when the mobile station is located relatively far from the BTS, that is greater than a critical distance, that a relatively few beam directions be selected each beam having a relatively high energy. However, when the distance between the BTS and the mobile station is less than a critical distance, it is preferred that a relatively large number of beam directions be selected with each beam having a relatively low energy. The critical distance is dependent on the environment of each individual cell and may be around 0.5 to 1 km. The weighting pattern or weighting algorithm may be such that the number of beams which are selected is variable and that more beams are selected when the mobile station is relatively close to the BTS.

Any suitable method can be used to determine whether or not the distance between the MS and the BTS is greater than the critical distance. In one embodiment, the channel impulse response obtained for each of the possible directions is compared. If most of the received energy is distributed in three or less beam directions, then it is assumed than the distance between the BTS and MS is greater than the critical distance. Alternatively, if most of the received energy is received from four or more beam directions, then it is assumed that the distance between the MS and BTS is less than the critical distance.

It is also possible for a comparison block to use the timing advance information in order to determine whether or not the distance between the MS and BTS is greater or less than the critical distance. This method is preferred in some embodiments of the invention as it is gives more accurate results than the previously outlined above.

Once a determination has been made as to the distance between the mobile station and the BTS, this information can be used to select a suitable weighting pattern or algorithm. For example, when the BTS and the mobile station are relatively close, the weighting pattern illustrated in FIGS. 5c or d may be selected.

In another modification to the present invention, a single weight pattern may be stored in the weight pattern bank and that fixed pattern is used for all situations.

It should be emphasised that any suitable weighting pattern can be used and not just the weighting patterns shown in FIGS. 5a to d. The weighting patterns illustrated can be replaced by suitable algorithms which calculate appropriate weights. Such algorithms can take into account various factors such as the radio environment and the distance of the mobile station and the base transceiver station in order to calculate the appropriate weights. The weighting patterns can differ for different beam directions or the same for all beam directions.

In another modification to the present invention, not only is beam direction and signal strength information determined and stored by the beam pre-selection and memory block 100 and 102, but also the weighting patterns are applied to the information on the beam strength by the weighting pattern block to determine the strength of the data burst to be transmitted in the or each of the beam directions. The power for the data burst to be transmitted in the selected beam direction or directions will then be determined based on the strength of the data bursts received on the K preceding data bursts. The strength which is determined may differ for the different beam directions when more than one beam direction is selected.

It should be appreciated that the weighting pattern applied by the spatio-temporal weighting pattern block may be changed on a burst by burst basis.

Figure 6:
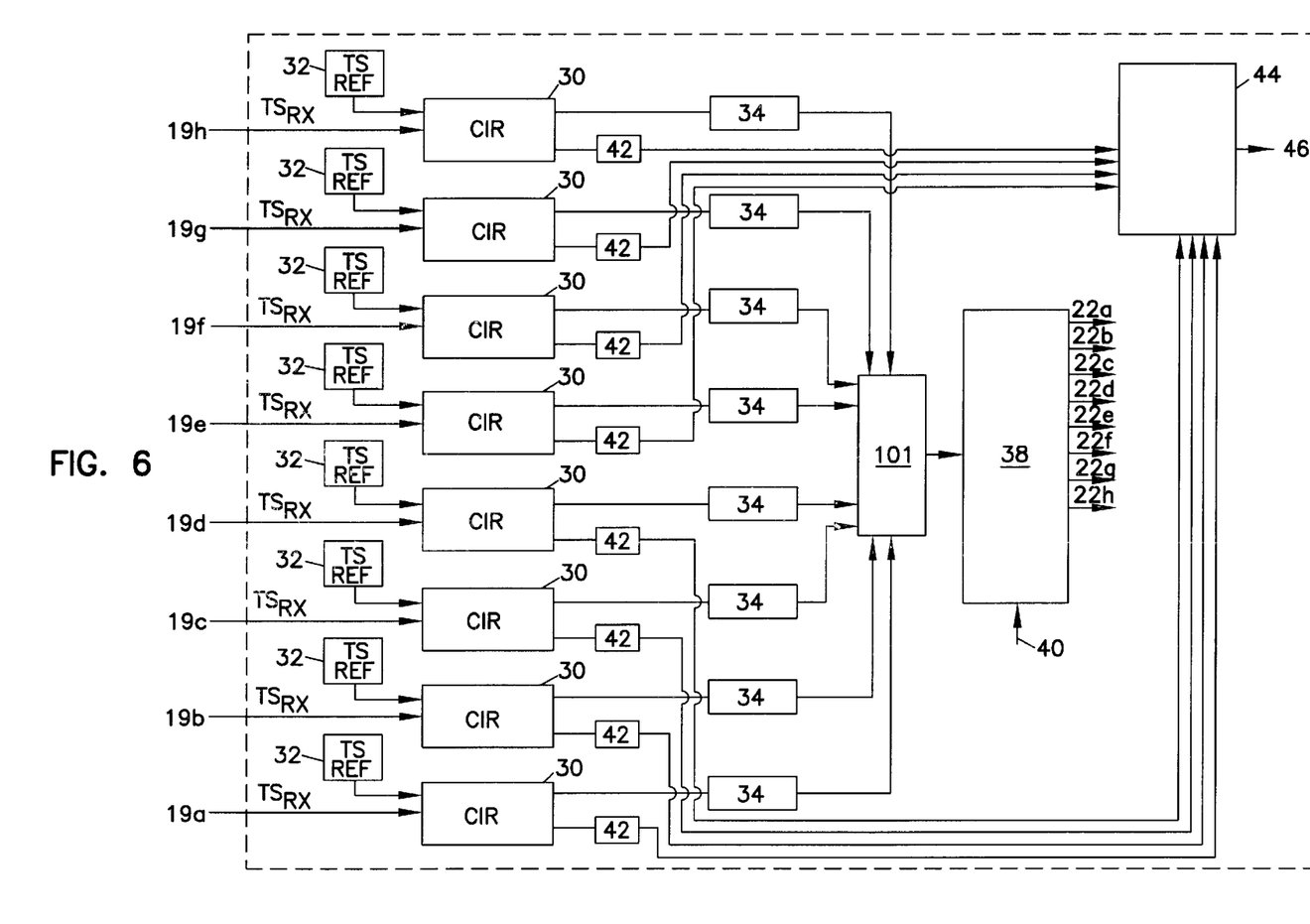
FIG. 6 shows a schematic view of the digital signal processor of FIG. 2.

Reference will now be made to FIG. 6 which schematically illustrates in more detail the digital signal processor 21. It should be appreciated that the various blocks illustrated in FIG. 6 do not necessarily correspond to separate elements of an actual digital signal processor 21 embodying the present invention. In particular, the various blocks illustrated in FIG. 6 correspond to various functions carried out by the digital signal processor 21. In one embodiment of the present invention, the digital signal processor 21 is at least partially implemented in integrated circuitry and several functions may be carried out by the same element.

Each signal received by the digital signal processor 21 on the respective inputs 19a–h is input to a respective channel impulse response (CIR) estimator block 30. The CIR estimator block 30 includes memory capacity in which the estimated channel impulse response is stored. The CIR estimator block also includes memory capacity for temporarily storing the received signal. The channel impulse response estimator block 30 is arranged to estimate the channel impulse response of the channel of the respective input 19a–h. As already discussed an associated channel can be defined for the given data burst transmitted in the selected frequency band, the allocated time slot and the beam direction from which the signal is received. The beam direction from which a signal is received is ascertained by the Butler matrix circuitry 8 so that a signal received at input 19a of the digital signal processor represents mainly the signal that has been received from the direction of beam $b_1$ and so on. It should be appreciated that the signal received at a given input may also include the side lobes of the signal received on, for example, adjacent inputs.

Each data burst which is transmitted from a mobile station MS to the BTS 4 includes a training sequence TS. However, the training sequence $TS_{RX}$ which is received by the BTS 4 is affected due to noise and also due to multipath effects which leads to interference between adjacent bits of the training sequence. This latter interference is known as intersymbol interference. $TS_{RX}$ is also affected by interference from other mobile stations, for example mobile stations located in other cells or cell sectors using the same frequency which may cause co-channel interference. As will be appreciated, a given signal from the MS may follow more than one path to reach the BTS and more than one version of the given signal may be detected by the antenna array 6 from a given direction. The training sequence $TS_{RX}$ which is received from input 19a is cross correlated by the CIR estimator block 30 with a reference training sequence $TS_{REF}$ stored in a data store 32. The reference training sequence $TS_{REF}$ is the same as the training sequence which is initially transmitted by the mobile station. In practice the received training sequence $TS_{RX}$ is a signal modulated onto a carrier frequency while the reference training sequence $TS_{REF}$ is stored as a bit sequence in the data store 32. Accordingly, before the cross-correlation is carried out, the stored reference training sequence is similarly modulated. In other words the distorted training sequence received by the BTS 4 is correlated with the undistorted version of the training sequence. In an alternative embodiment of the invention, the received training sequence is demodulated prior to its correlation with the reference training sequence. In this case, the reference training sequence would again have the same form as the received training sequence. In other words, the reference training sequence is not modulated.

The reference training sequence $TS_{REF}$ and the received training sequence $TS_{RX}$ each are of length L corresponding to L bits of data and may for example be 26 bits. The exact location of the received training sequence $TS_{RX}$ within the allocated time slot may be uncertain. This is because the distance of the mobile station MS from the BTS 4 will influence the position of the data burst sent by the MS within the allotted time slot. For example, if a mobile station MS is relatively far from the BTS 4, the training sequence may occur later in the allotted time slot as compared to the situation where the mobile station MS is close to the BTS 4.

To take into account the uncertainty of the position of the received training sequence $TS_{RX}$ within the allotted time slot, the received training sequence $TS_{RX}$ is correlated with the reference training sequence $TS_{REF}$ n times. Typically, n may be for example 7 or 9. It is preferred that n be an odd number. The n correlations will typically be on either side of the maximum obtained correlation. The relative position of the received training sequence $TS_{RX}$ with respect to the reference training sequence $TS_{REF}$ is shifted by one position between each successive correlation. Each position is equivalent to one bit in the training sequence and represents one delay segment. Each single correlation of the received training sequence $TS_{RX}$ with the reference training sequence $TS_{REF}$ gives rise to a tap which is representative of the channel impulse response for that correlation. The n separate correlations gives rise to a tap sequence having n values.

Figure 7:
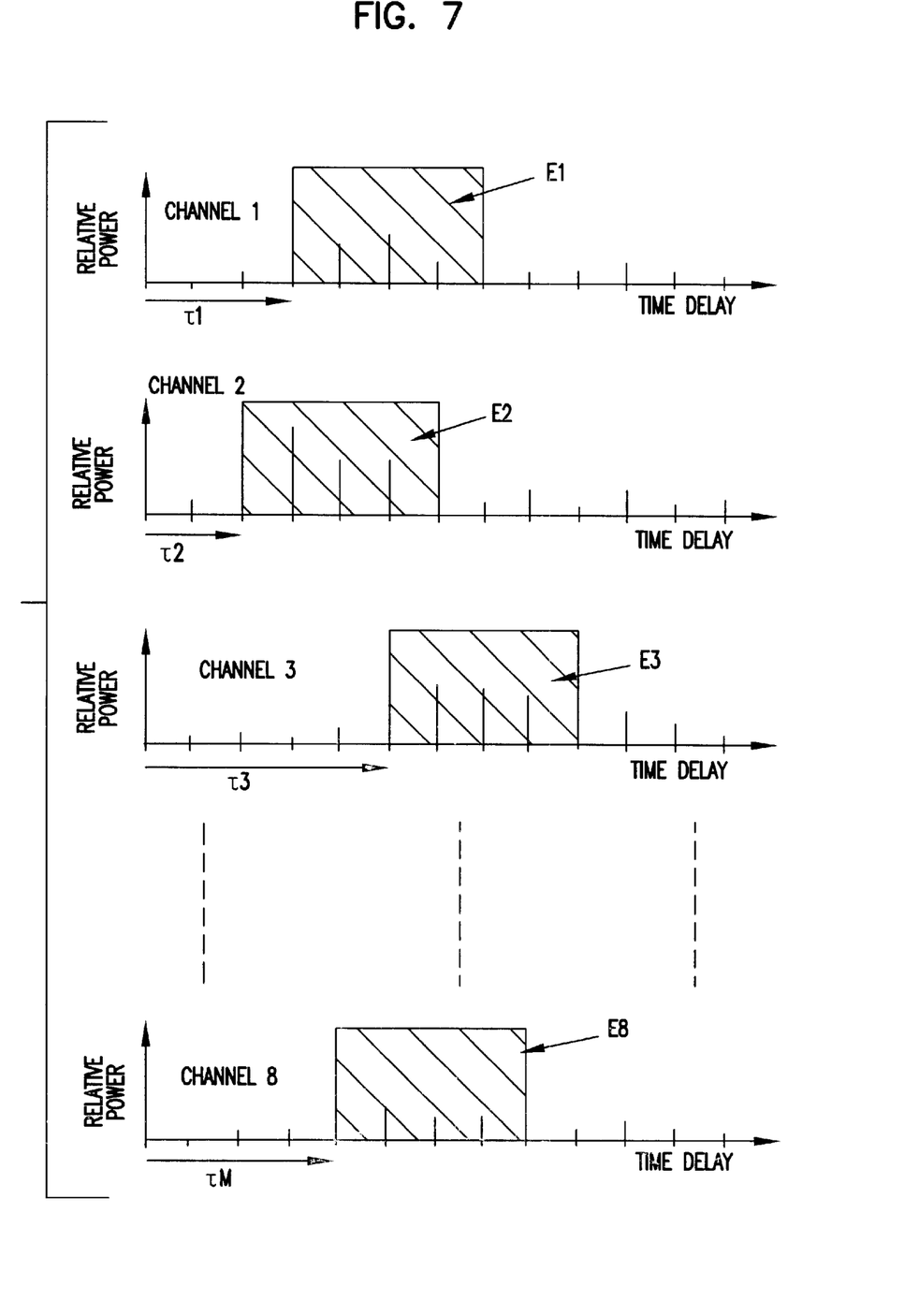
FIG. 7 illustrates the channel impulse response for four channels, out of the eight channels.

Reference is now made to FIG. 7 which shows the channel impulse response for four of the eight possible channels corresponding to the eight spacial directions. In other words, FIG. 5 shows the channel impulse response for four channels corresponding to a given data burst received in four of the eight beam directions from the mobile station, the data burst being in a given frequency band and in a given time slot. The x axis of each of the graphs is a measure of time delay whilst the y axis is a measure of relative power. Each of the lines (or taps) marked on the graph represents the multipath signal received corresponding to a given correlation delay. Each graph will have n lines or taps, with one tap corresponding to each correlation.

From the estimated channel impulse response, it is possible to determine the location of the training sequence within the allotted time slot. The largest tap values will be obtained when the best correlation between the received training sequence $TS_{RX}$ and the reference training sequence $TS_{REF}$ is achieved.

The CIR estimator block 30 also determines for each channel the five (or any other suitable number) consecutive taps which give the maximum energy. The maximum energy for a given channel is calculated as follows:

$$E = \sum_{j=1}^{5} (h_j)^2 \qquad (I)$$

where h represents the tap amplitude resulting from a cross correlation of the reference training sequence $TS_{REF}$ with the received training sequence $TS_{RX}$. The CIR estimator block 30 estimates the maximum energy for a given channel by using a sliding window technique. In other words, the CIR estimator block 30 considers each of five adjacent values and calculates the energy from those five values. The five adjacent values giving the maximum energy are selected as representative of the impulse response of that channel.

The energy can be regarded as being a measure of the strength of the desired signal from a given MS received by the BTS 4 from a given direction. This process is carried out for each of the eight channels which represent the eight different directions from which the same data burst could be received. The signal which is received with the maximum energy has followed a path which provides the minimum attenuation of that signal.

An analysis block 34 is provided which stores the maximum energy calculated by the CIR estimator block 30 for the respective channel for the five adjacent values selected by the CIR estimator block as being representative of the channel impulse response. The analysis block 34 may also analyse the channel impulse responses determined by the CIR block 30 to ascertain the minimum delay. The delay is a measure of the position of the received training sequence $TS_{RX}$ in the allotted time slot and hence is a relative measure of the distance travelled by a signal between the mobile station and the BTS 4. The channel with the minimum delay has the signal which has travelled the shortest distance. This shortest distance may in certain cases represent the line of sight path between the mobile station MS and the BTS 4.

The analysis block 34 is arranged to determine the position of the beginning of the window defining the five values providing the maximum energy. The time delay is then determined based on the time between a reference point and the beginning of the window. That reference point may be the common time when all received training sequences in each branch start to be correlated, the time corresponding to the earliest window edge of all the branches or a similar common point. In order to accurately compare the various delays of the different channels, a common timing scale is adopted which relies on the synchronisation signal provided by the BTS 4 in order to control the TDMA mode of operation. In other words, the position of the received training sequence $TS_{RX}$ in the allotted time slot is a measure of the time delay. It should be appreciated that in known GSM systems, the delay for a given channel is calculated in order to provide timing advance information. Timing advance information is used to ensure that a signal transmitted by the mobile station to the BTS falls within its allotted time slot. The timing advance information can be determined based on the calculated relative delay and the current timing advance information. If the mobile station MS is far from the base station, then the MS will be instructed by the BTS to send its data burst earlier than if the mobile station MS is close to the BTS.

The results of the analysis carried out by each of the analysis blocks 34 are input to the beam selection block 101 which has already been described in relation to FIG. 4.

The beam pre-selection block 100 of the beam selection block 101 uses the estimated channel impulse response in order to make the beam pre-selection. There are a number of different ways in which this can be achieved. If, for example, the beam pre-selection block 100 is to determine a single beam direction for a given burst, then the beam pre-selection block 100 may ascertain which channel and hence which beam direction has the desired maximum energy for a given data burst in a given frequency band in a given time slot. This means that the beam direction from which the strongest version of the given data burst is received can be ascertained. This direction may be used as the selected beam direction. Alternatively, the beam pre-selection block 100 may ascertain which of the channels has a minimum delay. In other words, the channel and hence the beam direction having the data burst which has followed the shortest path can be ascertained and used as the selected beam direction for a given data burst.

It should be appreciated that in embodiments of the present invention, more than one beam direction can be selected by the beam pre-selection block 100 for a given data burst. For example, the two directions from which the strongest version of a given data signal are received can be selected as the given beam directions. Likewise, the two beam directions providing the signal with the least delay may be selected as the beam directions. It would of course be possible for the beam pre-selection block 100 to ascertain the direction from which the strongest signal is received as well as the direction having the least delay and selecting those two directions as the selected directions.

The beam pre-selection block 100 may also receive the associated energy, calculated by the respective analysis block 34, for the given selected beam direction.

The beam selection block 100 provides an output to generating block 38 which indicates which beam directions are to be used to transmit signals from the BTS 4 to the MS and also the appropriate power level to be used with each of those beam directions.

Generating block 38 is responsible for generating the signals which are to be output from the digital signal processor 21. The generating block 38 has an input 40 representative of the speech and/or information to be transmitted to the mobile station MS. Generating block 38 is responsible for encoding the speech or information to be sent to the mobile station MS and includes a training sequence and a synchronising sequence within the signals. Block 38 is also responsible for production of the modulating signals. Based on the generated signal and determined beam direction, generating block 38 provides signals on the respective outputs 22a–h of the digital signal processor 21. The generating block 38 also provides an output 50 which is used to control the amplification provided by amplifiers 24 to ensure that the signals transmitted in the principal one or more beam directions have the required power levels.

The output of the channel impulse response block 30 is also used to equalise and match the signals received from the mobile station MS. In particular, the effects of intersymbol interference resulting from multipath propagation can be removed or alleviated from the received signal by the matched filter (MF) and equaliser block 42. It should be appreciated that the matched filter (MF) and equalizer block 42 has an input (not shown) to receive the received signal from the MS. The output of each block 42 is received by recovery block 44 which is responsible for recovering the speech and/or the information sent by the MS. The steps carried out by the recovery block include demodulating and decoding the signal. The recovered speech or information is output on output 48.

It should be appreciated that whilst the above described embodiment has been implemented in a GSM cellular communication network, it is possible that the present invention can be used with other digital cellular communication networks as well as analogue cellular networks. The above described embodiment uses a phased array having eight elements. It is of course possible for the array to have any number of elements. Alternatively, the phased array could be replaced by discrete directional antennae each of which radiates a beam in a given direction. The Butler matrix circuitry can be replaced by any other suitable phase shifting circuitry, where such circuitry is required. The Butler matrix circuitry is an analogue beam former. It is of course possible to use a digital beam former DBF or any other suitable type of analogue beam former. The array may be controlled to produce more than eight beams, even if only eight elements are provided, depending on the signals supplied to those elements.

It is also possible for a plurality of phased arrays to be provided. The phased arrays may provide a different number of beams. When a wide angular spread is required, the array having the lower number of elements is used and when a relatively narrow beam is required, the array having the larger number of elements is used.

As will be appreciated, the above embodiment has been described as providing eight outputs from the Butler matrix circuitry. It should be appreciated that in practice a number of different channels will be output on each output of the Butler matrix at the same time. Those channels may be different frequency bands. The channels for different time slots will also be provided on the respective outputs. Whilst individual amplifiers, processors, analogue to digital converters and digital to analogue converters have been shown, these in practice may be each provided by a single element which has a plurality of inputs and outputs.

It should be appreciated that embodiments of the present invention have applications other than just in cellular communication networks. For example, embodiments of the present invention may be used in any environment which requires directional radio communication. For example, this technique may be used in PMR (Private Radio Networks) or the like.

What is claimed is:

1. A method of directional radio communication between a first station and a second station, said method comprising the steps of:

receiving at said first station a plurality of consecutive signals from said second station, said signals each being receivable from at least one of a plurality of different directions;

determining a value of at least one parameter for each of a plurality of sequential signals from the consecutive signals which are received by the first station from the second station; and selecting a value of at least one parameter for a signal to be transmitted from said first station to said second station, said value of the at least one parameter of the signal to be transmitted by the first station being selected in dependence on said determined value of said at least one parameter of said plurality of sequential signals, wherein said selecting step comprises applying a weighting pattern to said plurality of sequential signals.

2. A method as claimed in claim 1, wherein said step of determining a value of at least one parameter comprises determining the or each direction for each of the plurality of sequential signals from which said sequential signals are received and said selecting step comprises selecting at least one direction for the transmission of a signal from the first station to the second station, said at least one direction being selected in dependence on the determined direction for said plurality of sequential signals.

3. A method as claimed in claim 1, wherein said step of determining a value of at least one parameter comprises determining the strength of each of said plurality of sequential signals and said selecting step comprises selecting the strength of the signal to be transmitted to said second station, the strength of said signal being selected in dependence on said determined strengths for said plurality of sequential signals.

4. A method as claimed in claim 1, wherein said weighting pattern is a uniform weighting pattern, so that each of the sequential signals is given equal weight.

5. A method as claimed in claim 1, wherein said weighting pattern is such that the more recently received ones of said plurality of sequential signals are given more weight than the less recently received ones of said plurality of sequential signals.

6. A method as claimed in claim 5, wherein said weighting pattern is an exponential or a linearly increasing weighting pattern.

7. A method according to claim 1, including the step of determining the radio environment.

8. A method as claimed in claim 7, wherein said selecting means selects one of a plurality of weighting patterns in dependence on the radio environment.

9. A method as claimed in claim 1, comprising the step of defining at the first station a plurality of beam directions for transmitting a radiation beam, wherein each of said beam directions is individually selectable.

10. A method as claimed in claim 1, wherein said first station is a base transceiver station in a cellular network.

11. A method as claimed in claim 1, wherein said second station is a mobile station.

12. A first station for directional radio communication with a second station, said first station comprising:

a receiver for receiving a plurality of consecutive signals from said second station, said signals each being receivable from at least one of a plurality of different directions;

circuitry for determining the value of at least one parameter for each of a plurality of sequential signals from the consecutive signals which are received by the first station from the second station;

a transmitter for transmitting a signal from the first station to the second station; and a controller for controlling said transmitter, said controller being arranged to select a value of at least one parameter for the signal to be transmitted by said transmitter, said value of at least one parameter being selected in dependence on the determined values of said at least one parameter for said plurality of sequential signals, wherein said controller is arranged to apply a weighting pattern to said plurality of sequential signals.

13. A first station as claimed in claim 12, wherein said circuitry for determining the value of at least one parameter is arranged to determine the or each direction for each of the plurality of sequential signals and the controller is arranged to select at least one direction for the transmission of the signal by the transmitter, said at least one direction being selected in dependence on the determined directions for said plurality of sequential signals.

14. A first station as claimed in claim 12, wherein said circuitry for determining the value of at least one parameter is arranged to determine the strength of each of said plurality of sequential signals and the controller is arranged to select the strength of the signal to be transmitted by the transmitter, the strength of the signal being selected in dependence on the determined strengths for said plurality of sequential signals.

15. A first station as claimed in claim 12, wherein a store is provided for storing said determined parameters for each of the plurality of sequential signals.

* * * * *